US012194535B2

(12) United States Patent
Widulle et al.

(10) Patent No.: US 12,194,535 B2
(45) Date of Patent: Jan. 14, 2025

(54) METHOD AND APPARATUS FOR ADDITIVE MANUFACTURING OF A WORKPIECE

(71) Applicants: Carl Zeiss AG, Oberkochen (DE); Carl Zeiss Industrielle Messtechnik GmbH, Oberkochen (DE)

(72) Inventors: Frank Widulle, Neu-Ulm (DE); Christian Platt, Ulm (DE); Thomas Milde, Nausnitz (DE); Bernhard Wiedemann, Rottenburg (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 659 days.

(21) Appl. No.: 17/526,717

(22) Filed: Nov. 15, 2021

(65) Prior Publication Data

US 2022/0072620 A1   Mar. 10, 2022

Related U.S. Application Data

(63) Continuation of application No. PCT/EP2020/063012, filed on May 11, 2020.

(30) Foreign Application Priority Data

May 15, 2019 (DE) ................. 10 2019 112 757.2

(51) Int. Cl.
*B22F 10/85* (2021.01)
*B22F 10/28* (2021.01)
(Continued)

(52) U.S. Cl.
CPC ............. *B22F 10/85* (2021.01); *B22F 10/28* (2021.01); *B22F 10/38* (2021.01); *B23K 26/082* (2015.10);
(Continued)

(58) Field of Classification Search
CPC ......... B33Y 10/00; B33Y 50/02; B33Y 30/00; B23K 15/0086; B23K 26/34;
(Continued)

(56) References Cited

U.S. PATENT DOCUMENTS 6,309,809 B1   10/2001   Starikov et al.
6,483,596 B1   11/2002   Philippi et al.
(Continued)

FOREIGN PATENT DOCUMENTS

DE   10101057 A1   6/2002
DE   10314461 A1   11/2003
(Continued)

OTHER PUBLICATIONS

Sarah K. Everton et al., "Review of in-situ process monitoring and in-situ metrology for metal additive manufacturing," Materials and Design 95 (2016) p. 431-445, Published by Elsevier Ltd. <https://www.sciencedirect. com/science/article/pii/S0264127516300995>.
(Continued)

*Primary Examiner* — Eric S Stapleton
(74) *Attorney, Agent, or Firm* — Miller Johnson

(57) ABSTRACT

In a method for additive manufacturing of a workpiece, a data set defines the workpiece in multiple layers. A first energy beam is moved relative to a manufacturing platform along first trajectories to produce, in temporally successive steps, a stack of workpiece layers. Individual properties of the stack are determined using a measurement arrangement having an exciter that excites the stack with a second energy beam, and having a detector that detects properties of the stack resulting from an excitation along a defined detection path in a spatially resolved manner. At least one of the second energy beam and the detection path is moved relative to the manufacturing platform along further trajectories using a further scanning unit. The first scanning unit and the (Continued)

further scanning unit establish completely separate beam paths for the first energy beam and the at least one of the second energy beam and the detection path.

17 Claims, 7 Drawing Sheets

(51) Int. Cl.
| | |
|---|---|
| *B22F 10/38* | (2021.01) |
| *B23K 26/082* | (2014.01) |
| *B23K 26/34* | (2014.01) |
| *B28B 1/00* | (2006.01) |
| *B28B 17/00* | (2006.01) |
| *B33Y 10/00* | (2015.01) |
| *B33Y 30/00* | (2015.01) |
| *B33Y 50/02* | (2015.01) |

(52) U.S. Cl.
CPC .............. *B23K 26/34* (2013.01); *B28B 1/001* (2013.01); *B28B 17/0081* (2013.01); *B33Y 10/00* (2014.12); *B33Y 30/00* (2014.12); *B33Y 50/02* (2014.12)

(58) Field of Classification Search
CPC ..... B23K 26/082; B23K 26/342; B22F 10/38; B22F 10/28; B22F 12/47; B22F 12/90; B22F 10/85; B22F 12/45; B22F 2203/03; B22F 2999/00; B28B 1/001; B28B 17/0081; Y02P 10/25
USPC .................................................. 219/121.66
See application file for complete search history.

(56) References Cited

U.S. PATENT DOCUMENTS

| | | | |
|---|---|---|---|
| 6,930,278 | B1 | 8/2005 | Chung et al. |
| 7,043,330 | B2 | 5/2006 | Toyserkani et al. |
| 7,278,315 | B1 | 10/2007 | Klein et al. |
| 8,514,389 | B2 | 8/2013 | Aoki |
| 8,666,142 | B2 | 3/2014 | Shkolnik |
| 8,778,252 | B2 | 7/2014 | Mackie et al. |
| 8,804,102 | B2 | 8/2014 | Green |
| 9,527,272 | B2 | 12/2016 | Steele |
| 9,936,995 | B2 | 4/2018 | Dacosta et al. |
| 2005/0248065 | A1 | 11/2005 | Owanda |
| 2007/0228592 | A1 | 10/2007 | Dunn et al. |
| 2009/0024243 | A1 | 1/2009 | Suh |
| 2009/0248355 | A1 | 1/2009 | Kriegmair |
| 2010/0125356 | A1 | 5/2010 | Shkolnik et al. |
| 2011/0061591 | A1 | 3/2011 | Stecker |
| 2011/0130854 | A1 | 6/2011 | Lettenbauer et al. |
| 2013/0015596 | A1 | 1/2013 | Mozeika et al. |
| 2013/0078821 | A1 | 3/2013 | Furutono |
| 2013/0178952 | A1 | 7/2013 | Wersborg et al. |
| 2013/0189435 | A1 | 7/2013 | Mackie et al. |
| 2014/0107823 | A1 | 4/2014 | Huang |
| 2014/0271961 | A1 | 9/2014 | Khoshnevis |
| 2015/0045928 | A1 | 2/2015 | Perez et al. |
| 2015/0140147 | A1 | 5/2015 | Konstantinos |
| 2015/0165681 | A1 | 6/2015 | Fish et al. |
| 2015/0174828 | A1 | 6/2015 | Creuzer et al. |
| 2015/0375456 | A1 | 12/2015 | Cheverton et al. |
| 2016/0193790 | A1 | 7/2016 | Shuck et al. |
| 2017/0059529 | A1 | 3/2017 | Kamel et al. |

FOREIGN PATENT DOCUMENTS

| | | |
|---|---|---|
| DE | 102008016026 A1 | 10/2009 |
| DE | 102008034117 A1 | 2/2010 |
| DE | 102016115241 A1 | 3/2017 |
| DE | 102016110266 A1 | 12/2017 |
| EP | 1815936 B1 | 11/2009 |
| EP | 2313867 B2 | 11/2011 |
| WO | 2018197389 A1 | 1/2018 |
| WO | 2019028184 A1 | 2/2019 |

OTHER PUBLICATIONS

Scott Betts et al., "The relationship between In-Process Quality Metrics & Computational Tomography," Sigma Labs, Inc. <http://sigmalabsinc.com/wp-content/uploads/2019/02/TEP-CT-correlation-Sigma-Labs- Quality-Assurance.pdf>.
Will Dalrymple, "Pooling information," Machinery Magazine, Published Aug. 2015 <http://www.machinery.co.uk/machinery-features/ concept-laser-is-promising-additive-manufacturing-users-a-more-comprehensive-part-propertyanalysis- tool>.
Volker Carl, "Monitoring system for the quality assessment in Additive Manufacturing," carl@t-zfp.de <http://www.impulsthermografie.de/QNDE2014-Proceeding_EN_V3.pdf>.
Trumpf, "Deposition welding, Building shapes our of powder and wire," Retrieved from the internet on Dec. 2, 2021 <https://www.trumpf.com/en_US/solutions/applications/laser-welding/deposition-welding/>.
Econolyst, "Direct Rapid Manufacturing of Metallic Parts—A UK Industry overview," Enconolyst Ltd, Wirksworth, Derbyshire, UK, Feb. 2008.
RJ Dewhurst et al., "Optical remote measurement of ultrasound," Meas. Sci. Technol. 10 (1999) R139-R168, Published Jul. 15, 1999.
Miguel Avervallilo Herraez et al., "Fast two-dimensional phase-unwrapping algorithm based on sorting by reliability following a noncontinuous path," Applied Optics, vol. 41, No. 35, Published Dec. 10, 2002, Optical Society of America,.
Lawrence Livermore National Laboratory, "Real-time Melt Pool Sensor," Retrieved from the internet on May 6, 2019, <https://manufacturing.llnl.gov/additive-manufacturing/accelerated-certification/real-time-melt-pool-sensor>.
G. Zenzinger et al., "Online-Prozesskontrolle bei der additiven Fertigung mittels Laserstrahlschmelzen," NDT Journal, Technical papers from ZfP Zeitung, Jun. 2014.
Mitsuo Takeda et al., "Fourier-transform method of fringe-pattern analysis for computer-based topography and interferometry," Journal of the Optical Society of America vol. 72, No. 1, Jan. 1982.

METHOD AND APPARATUS FOR ADDITIVE MANUFACTURING OF A WORKPIECE

CROSS-REFERENCE TO RELATED APPLICATIONS

This application is a continuation of international patent application PCT/EP2020/063012 filed on May 11, 2020, which claims priority to German patent application 10 2019 112 757.2 filed on May 15, 2019. The entire contents of these applications are incorporated herein by reference.

BACKGROUND

The present invention relates to a method and an apparatus for additive manufacturing of a workpiece.

Additive methods for the production of workpieces are sometimes referred to as 3D printing. There are various additive manufacturing methods. In one method known as selective laser sintering (SLS), for example, a so-called powder bed having a plurality of metallic powder particles is used. Selected powder particles on the upper side of the powder bed are melted with the aid of a laser beam in a spatially resolved manner, i.e. locally selectively, and bonded to one another in this way. A new powder layer is then applied on the workpiece structure, and the workpiece is thus produced layer by layer. Other additive manufacturing methods use an electron beam instead of a laser beam. Still further methods selectively apply a powdery or wire-like material on a manufacturing platform and selectively melt it with an electron or laser beam. The electron beam or laser beam are examples of a first energy beam with which a structuring tool can produce a material structure layer by layer, which material structure forms the workpiece after all layers have been completed. The individual workpiece layers are often produced from the bottom to the top on the manufacturing platform, wherein the manufacturing platform itself is lowered by the corresponding layer height after each workpiece layer.

Additive manufacturing of workpieces makes it possible to produce individual workpieces with a high degree of complexity and low material costs. At the same time, there are major challenges in terms of workpiece quality, as inhomogeneities or anomalies of the material can arise in each layer, which can have a negative effect on the quality of the workpiece. Such inhomogeneities/anomalies can include pores, cracks, unmelted material, etc. For this reason, there are numerous proposals for detecting inhomogeneities/anomalies in an additively manufactured workpiece as early as during the production of the layers.

The publication "Review of in-situ process monitoring and in-situ metrology for metal additive manufacturing" by Sarah K. Everton et al. in Materials and Design 95 (2016), pages 431 to 445, gives an overview. According to one proposal, what is known as the melt pool, that is to say the material region melted with the energy beam, is recorded with a camera, and the temperature averaged over the melt pool is determined. The data obtained can be used to monitor the production process, but they do not provide any direct information on quality-relevant inhomogeneities/anomalies, some of which only arise after the melt pool has solidified.

In some proposals, the observation beam path of the camera is integrated into the beam path of the structuring tool with the aid of beam splitters. In deviation herefrom, US 2015/0375456 A1 proposes a separate scanning unit for monitoring the melt pool.

EP 1 815 936 B1 describes a method for additive manufacturing of a workpiece, wherein an ultrasonic wave pattern is excited in an upper workpiece layer with the aid of a second laser beam. The ultrasonic waves interact with inhomogeneities/anomalies and generate interference patterns that can be determined on the basis of echo responses from the surface. Furthermore, EP 1 815 936 B1 proposes an electrical eddy current analysis of the respectively upper material layer and also a dimensional measurement with the aid of speckle interferometry, a laser scanner, or a stereo-optical system. The laser for generating the ultrasonic wave pattern should follow the laser of the structuring tool at a fixed distance of a few centimeters. A similar proposal is disclosed in U.S. Pat. No. 7,278,315 B1.

DE 10 2016 110 266 A1 proposes that a light beam used for process monitoring be coupled into the optical unit of the processing beam. The measurement beam can be freely positioned in the working region of the processing beam using an additional, separate scanning mirror. Nevertheless, process monitoring is spatially coupled to the working region of the processing beam.

SUMMARY

Against this background, it is an object of the invention to provide a method and an apparatus for additive manufacturing, which allow for improved monitoring of the production process.

It is another object to provide a method and an apparatus for additive manufacturing, which allow to detect inhomogeneities/anomalies, which may occur during the production process, as early as possible It is yet another object to provide a method and an apparatus for additive manufacturing, which allow for in-process corrections of inhomogeneities/anomalies occurred during the manufacturing process.

According to a first aspect, there is provided a method for additive manufacturing of a workpiece, comprising the steps of: obtaining a data set that defines the workpiece in a plurality of layers arranged one on top of another, providing a manufacturing platform, providing a structuring tool having a first scanning unit, which is configured to move a first energy beam in a spatially resolved manner relative to the manufacturing platform, determining a plurality of first trajectories using the data set, moving the first energy beam relative to the manufacturing platform in temporally successive steps along a respective first trajectory from the plurality of first trajectories in order to produce, in the temporally successive steps, a stack of workpiece layers arranged one on top of another, which workpiece layers correspond to the first trajectories, determining individual properties of the stack using a measurement arrangement having an exciter that excites the stack with a second energy beam, and having a detector that detects properties of the stack resulting from an excitation along a defined detection path in a spatially resolved manner, wherein at least one of the second energy beam or the detection path is moved relative to the manufacturing platform along a plurality of further trajectories using a further scanning unit, wherein the first scanning unit and the further scanning unit establish completely separate beam paths for the first energy beam and the at least one of the second energy beam or the detection path, and wherein the further trajectories differ at least partially from the first trajectories.

According to a further aspect, there is provided an apparatus for additive manufacturing of a workpiece, comprising an interface for obtaining a data set that defines the workpiece in a plurality of layers arranged one on top of another, comprising a manufacturing platform, comprising a structuring tool having a first scanning unit, which is configured to move a first energy beam in a spatially resolved manner relative to the manufacturing platform, comprising a controller controlling the first scanning unit using the data set in order to move the first energy beam relative to the manufacturing platform in temporally successive steps along a plurality of first trajectories, wherein the structuring tool produces, in the temporally successive steps, a stack of workpiece layers arranged one on top of another, which workpiece layers correspond to the first trajectories, and comprising a measurement arrangement, which is configured to determine individual properties of the stack, wherein the measurement arrangement has an exciter, which is configured to excite the stack with a second energy beam, wherein the measurement arrangement has a detector, which is configured to detect properties of the stack resulting from an excitation along a detection path in a spatially resolved manner, wherein the measurement arrangement has a further scanning unit, wherein the controller is configured to control the further scanning unit separately from the first scanning unit in such a manner that at least one of the second energy beam or the detection path moves relative to the manufacturing platform along a plurality of further trajectories, wherein the further trajectories can differ from the first trajectories, and wherein the first scanning unit and the further scanning unit establish completely separate beam paths for the first energy beam and the at least one of the second energy beam or the detection path.

The novel apparatus thus has the ability to move the first energy beam (writing beam) and a second energy beam and/or detection path (measurement beam or measurement beams) largely independently of one another relative to the manufacturing platform and a workpiece surface arranged on the manufacturing platform. Largely independent in this context means that the first scanning unit and the further scanning unit are different from one another and can be controlled in such a manner that the further trajectory, along which the second energy beam and/or detection path moves, differs from the first trajectory. In contrast to prior art approaches mentioned above, the first energy beam and the measurement beam are thus no longer tied together and inevitably move along a common trajectory. The first energy beam and the measurement beam could in principle be moved along a common trajectory by suitable control of the first and further scanning units. However, the novel apparatus is not restricted thereto, and the novel method makes advantageous use of the fact that the further trajectories can differ at least partially and advantageously even completely from the first trajectories. In various embodiments, trajectories that are spatially distant from one another and differ from one another with respect to a respective instantaneous movement direction and/or movement speed are implemented. The second energy beam and/or detection path can advantageously be positioned at any point in time within the production process at a lateral distance from the first energy beam that is greater than half the diameter of the manufacturing platform in the corresponding distance direction. The practical consequence of this is that the layer stack can be inspected at a point that is "far" from an instantaneous processing position of the structuring tool on the layer stack. The layer stack can therefore advantageously be already inspected while structuring is simultaneously carried out at a measurement position that has already cooled down. This is advantageously made possible by the separate optical paths of the first energy beam and the second energy beam or detection path.

In various embodiments and refinements, which will be discussed in more detail below, a "collision" of the second energy beam and/or detection path with the first energy beam is avoided by suitable control of the first and further scanning units. Accordingly, various embodiments of the novel method and the novel apparatus involve the control of the first scanning unit being taken into account when controlling the further scanning unit (and/or vice versa) in order to avoid a "collision" or superposition of the energy beams. However, a dependency resulting therefrom with regard to the control of the first scanning unit and the further scanning unit does not conflict with the abovementioned ability to produce different trajectories separately from one another.

It is conceivable that, in some example embodiments of the novel method and the novel apparatus, the further scanning unit moves only the second energy beam or only the detection path of the measurement arrangement relative to the manufacturing platform. In principle, the second energy beam could excite the stack with the workpiece layers arranged one on top of another globally, that is to say in a non-spatially resolved manner, and spatially resolved detection of inhomogeneities/anomalies takes place substantially through suitable movement of the detection path. Conversely, it is in principle conceivable that a spatial resolution of the detection is achieved primarily by locally selective excitation of the stack with the second energy beam, while the stack or the stack surface as a whole is captured with a camera. In various embodiments, however, both the excitation of the stack with the second energy beam and the detection take place in each case in a locally selective manner. The explanations given above and below therefore apply equally to the detection path and to the second energy beam.

The novel method and the novel apparatus have the advantage that the inspection of the workpiece surface to detect any inhomogeneities/anomalies can be carried out simultaneously and nevertheless independently (apart from the advantageous avoidance of a superposition of the energy beams) of the production of a new workpiece layer. In particular, it is possible that the writing beam (first energy beam) and the measurement beam (second energy beam) move simultaneously in regions of the workpiece surface or the manufacturing platform that are as far apart as possible, with the result that, for example, a new workpiece layer is structured on the "left" side of the workpiece, while structuring that has already taken place is inspected on the "right" side of the workpiece. Accordingly, it is also possible to inspect structuring that took place at the beginning of a manufacturing step in a workpiece region and, if necessary, to correct it (rework) promptly before the next workpiece layer is started.

The novel method and the corresponding apparatus therefore allow flexible monitoring of the manufacturing process in close relationship to the process and allow selective detection of inhomogeneities/anomalies in already cured workpiece regions. The abovementioned object is thus achieved in its entirety.

In a preferred refinement of the novel method and the corresponding apparatus, the second energy beam and/or the detection path are moved in one of the temporally successive manufacturing steps with the aid of the further scanning unit along one further trajectory from the plurality of further trajectories, while the first energy beam is moved along a first trajectory.

In this refinement, the novel method and the corresponding apparatus make advantageous use of the possibility of inspecting the stack with the workpiece layers arranged one on top of another while the upper workpiece layer is still being produced with the first energy beam. Accordingly, the novel method and the corresponding apparatus of this refinement benefit from two simultaneous, separate movements of the energy beams. The refinement makes a contribution to the additive manufacturing of a high-quality workpiece in a short amount of time.

In a further refinement, the second trajectories are determined in dependence on the first trajectories, wherein preferably a superposition of the second energy beam and the first energy beam on the stack is avoided.

This refinement relates to an advantageous adaptation of the movement of the second energy beam (measurement beam) to the movements of the first energy beam (writing beam), without this resulting in a rigid structural coupling. When determining the second trajectories, it can advantageously be taken into account that the energy input into the layer stack within a defined spatial and temporal interval remains below a defined threshold. In this refinement, the measurement beam advantageously excites a local region of the workpiece layer only when the workpiece material has already cooled and hardened sufficiently in this region, i.e. below a defined temperature threshold. Heat spots, internal stresses, and delamination in the layer stack can thereby advantageously be minimized. In addition, the layers can be inspected more easily and more precisely. The second energy beam (heating) via the further scanning unit differs from the first energy beam (writing beam) in the various embodiments among other things in that it generates less energy than the first energy beam in order to remain below the melting temperature. The locally selective heating can also be taken into account when determining the further trajectories for optimized workpiece production ("local preheating"). Both taking into account a temperature limit and raising to a certain temperature can be used advantageously for process optimization.

In a further refinement, selected first trajectories are modified in dependence on the individual properties of the stack.

In this refinement, the novel method and the novel apparatus benefit from a correction of inhomogeneities/anomalies within the ongoing manufacturing process. In particular, inhomogeneities/anomalies in an upper workpiece layer can already be corrected before the production of this upper workpiece layer is fully completed. The refinement therefore makes an advantageous contribution to a particularly efficient production of high-quality workpieces.

In a further refinement, the further trajectories are determined iteratively in dependence on a modified first trajectory.

In this refinement, the structuring tool and the measurement arrangement interact with one another in a mutually dependent manner and adapt the respective first trajectories and further trajectories to one another in a mutually dependent manner in order to achieve optimum production of a workpiece in the shortest possible amount of time. In particular, a further trajectory can in this refinement likewise be modified in dependence on an already modified first trajectory in order to inspect a reworked point again and/or to limit and/or change the energy input at a specific point of the workpiece stack within a defined time interval in a targeted fashion.

In various embodiments, the further trajectories, along which the measurement arrangement moves the second energy beam and/or the detection path, are determined on the basis of a computer-aided simulation of the measurement process in dependence on the first trajectories. Based on the scanning strategy of the structuring tool, an optimum scanning strategy of the measurement arrangement is determined in a possibly iterative computer-aided simulation process in the various embodiments. The scanning strategy can include the density of the respective trajectories within a defined workpiece region, the movement direction, the movement speed, the energy or power of the respective energy beam, a pulse-pause ratio or other parameters. This simulation process preferably takes place before and/or during the manufacturing steps. Based on the individual properties of the stack, which can be determined with the aid of the measurement arrangement during the manufacturing steps, modified first trajectories are preferably determined in parallel to the writing process in order to correct inhomogeneities/anomalies promptly. For example, an inhomogeneity/anomaly can be corrected by renewed locally selective melting of a near-surface workpiece layer. In various embodiments, a point in a workpiece layer that has been corrected in this way is inspected again with the aid of the measurement arrangement in order to ensure that the inhomogeneity/anomaly has been successfully eliminated. If necessary, the mutually dependent inspection and correction can be repeated multiple times, and the first and further trajectories can accordingly be determined iteratively in a mutually dependent manner. In various embodiments, the parameters of the first energy beam can be varied in the course of the mutually dependent processing and inspection of a point of the workpiece layer in dependence on the individual properties determined in each case. For example, one or more of the parameters mentioned below can be varied in dependence on the data from the measurement arrangement: power density of the first energy beam, energy density of the first energy beam, focusing of the first energy beam, distance between adjacent trajectories of the first energy beam (track spacing). Furthermore, in some example embodiments, additional workpiece material or a special repair material can be supplied to the region of an inhomogeneity/anomaly in order to achieve a correction in dependence on the data of the measurement arrangement.

In a further refinement of the novel method and the corresponding apparatus, the further scanning unit moves the second energy beam and the detection path together along the plurality of further trajectories.

This refinement allows an implementation of the measurement arrangement within the apparatus with a single compact measurement module and is therefore advantageous in terms of assembly and maintenance and also of any replacement of the measurement arrangement.

In a further refinement, the further scanning unit has a first further scanning unit and a spatially distant and structurally separate second further scanning unit, wherein the first further scanning unit moves the second energy beam and wherein the second further scanning unit moves the detection path.

In this refinement, the exciter and the detector of the measurement arrangement can advantageously be arranged in separate housing modules which are spatially distant from one another and which are arranged, for example, on different sides of the manufacturing platform. The measurement arrangement can be more easily integrated in the novel apparatus with a division into a plurality of modules. Such an arrangement is advantageous in particular if the measurement arrangement detects near-surface deformations of the stack deflectometrically, i.e. via a detection path that includes the workpiece surface as a beam-shaping or wave-front-shaping element.

In a further refinement, the second energy beam and/or the detection path are moved continuously with the aid of the further scanning unit, and the measurement arrangement has a third scanning unit, which follows the further scanning unit.

In this refinement, the novel method and the corresponding apparatus use a third scanning unit, which is advantageously arranged between the detector and the further scanning unit. The third scanning unit can advantageously be used in order to reduce motion blur, which can occur with a continuous movement of the further scanning unit. The refinement makes it possible to determine near-surface inhomogeneities/anomalies very quickly and nevertheless with a high spatial resolution.

In a further refinement, the exciter heats the stack selectively and the measurement arrangement detects deformations and in particular deformation contrasts in the stack. The detector can advantageously detect deformation contrasts due to inhomogeneities deflectometrically and/or interferometrically. Targeted, locally selective heating (thermal excitation) of the stack with the aid of the second energy beam as the basis for an advantageous measurement arrangement is also an inventive refinement compared to the prior art, independently of the above-described movement of the first and second energy beams that is taking place in a detached manner.

The refinement allows a very simple and cost-effective implementation of the measurement arrangement. In various embodiments, the writing laser or, more generally, the structuring tool could be used to thermally excite a near-surface workpiece layer for a measurement/inspection. In various embodiments of the novel method and the novel apparatus, however, the second energy beam excites the workpiece layer, preferably over a time interval of a few microseconds up to a maximum of 500 milliseconds, particularly preferably with a heating interval whose duration lies in the range between 0.5 and 5 milliseconds. In various embodiments, the diameter of the second energy beam on the workpiece surface lies in the range of a few millimeters to a few centimeters, that is to say in particular in the order of magnitude of 0.3 to 1.5 cm. In various embodiments, the workpiece surface is locally heated with the aid of the second energy beam, wherein the temperature of the workpiece material is kept below the melting temperature of the workpiece material. Typically, heating with the second energy beam results in a temperature increase in the range of a few kelvins up to 300 kelvins, in some cases up to 500 kelvins.

In a further refinement, the exciter generates an ultrasonic wave in the stack.

In this refinement, the exciter excites the workpiece surface over a time interval that is in an order of magnitude of picoseconds up to nanoseconds, that is to say in a time interval that lasts less than one microsecond. In various embodiments of this refinement, the diameter of the second energy beam is of an order of magnitude of a few micrometers up to a few millimeters and is preferably less than 10 mm and particularly preferably less than 5 mm. The refinement has the advantage that near-surface inhomogeneities/anomalies that are hidden under the surface can be detected and localized very well on the basis of deformation contrasts. In some example embodiments, an ultrasonic detector can be arranged at the manufacturing platform and detect ultrasonic signals during the production and/or measurement of a layer.

In a further refinement, the measurement arrangement detects temperature contrasts in the stack.

In various embodiments of this refinement, the detector includes an infrared camera and/or a pyrometer. In various embodiments, a pyrometer can be implemented with two separate cameras and in each case upstream filters matched to different wavelength transmission ranges. The refinement makes it possible, as an alternative or in addition to the detection of temperature contrasts in the workpiece material that has already cured, to also monitor the melt pool in the region of the first energy beam with a high local resolution.

It goes without saying that the aforementioned features and those yet to be explained below can be used not only in the combination specified in each case but also in other combinations or on their own, without departing from the scope of the present invention.

BRIEF DESCRIPTION OF THE DRAWINGS

An example embodiment of the invention is illustrated in the drawings and explained in more detail in the following description. In the drawing.

DETAILED DESCRIPTION

Figure 1:
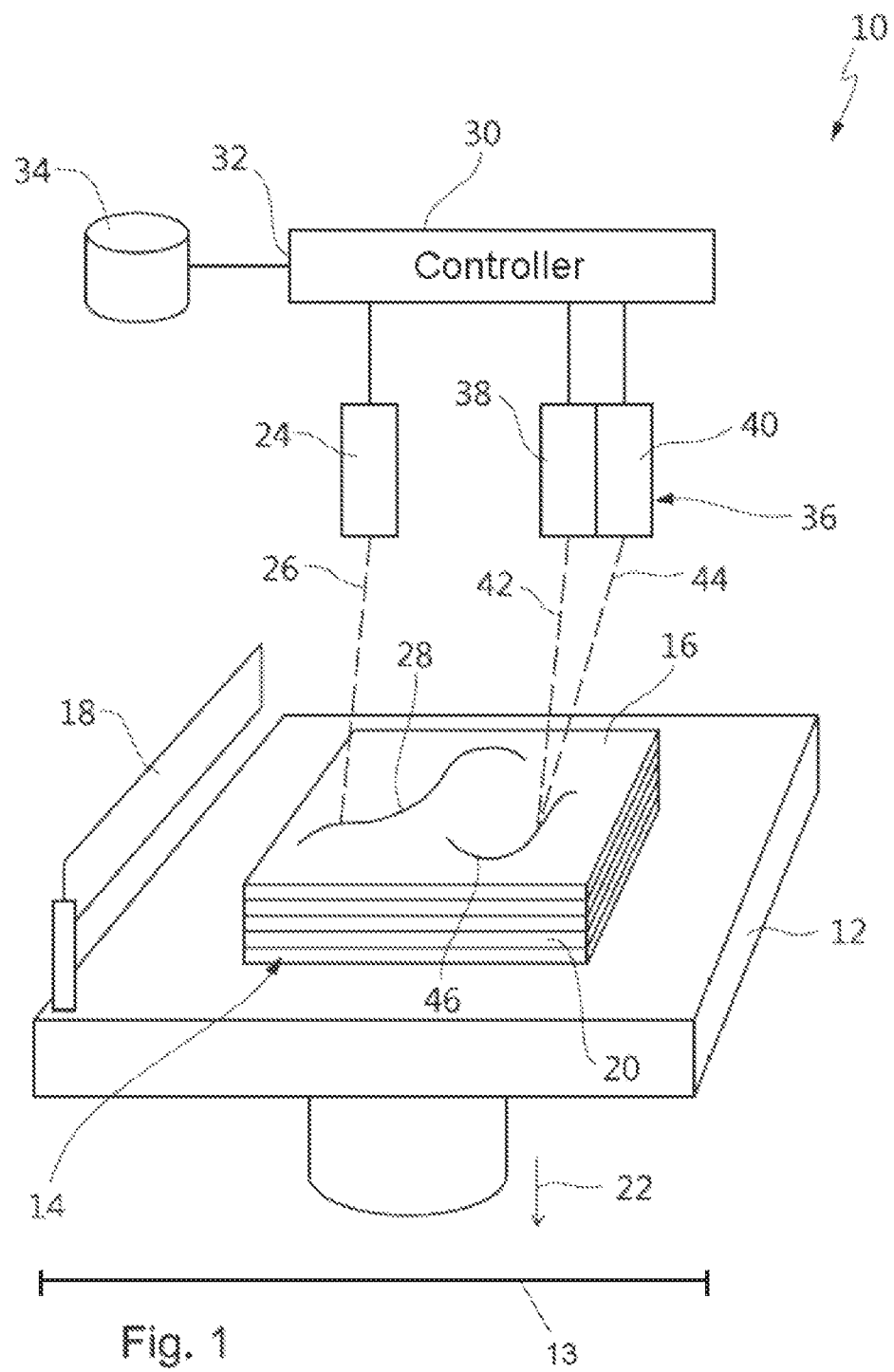
FIG. 1 shows a simplified illustration of an example embodiment of the novel apparatus.

In FIG. 1, an example embodiment of the novel apparatus is denoted in its entirety with the reference number 10. The apparatus 10 has a manufacturing platform 12 having a platform diameter 13, on which platform a workpiece 14 is additively manufactured here in accordance with an example embodiment of the novel method. The workpiece 14 is built up layer by layer from the bottom to the top in temporally successive steps. The topmost workpiece layer in FIG. 1 is denoted with reference number 16. After completion of a workpiece layer 16, a new material layer made of a powdery material, for example a metallic and/or ceramic material, is distributed on layer stack 20 with the aid of a doctor blade 18 in this example embodiment. For this purpose, the manufacturing platform 12 is typically lowered in the direction of arrow 22 by the height of the next material layer. Other example embodiments can include the application of a workpiece material without a doctor blade, that is to say, for example, a locally selective supply of a workpiece material with a movable tool head.

Reference number 24 here generally denotes a structuring tool which, in the example embodiment shown, generates a laser beam 26 and moves it relative to the manufacturing platform 12 and the material layer 16 to be structured with the aid of a first scanning unit (not shown in FIG. 1). Reference number 28 denotes a first trajectory, along which laser beam 26 is moved here on layer 16 in order to locally selectively melt the powdery material particles along trajectory 28.

In further example embodiments, the structuring tool 24 can generate an electron beam in order to structure a workpiece layer on the manufacturing platform 12. In further example embodiments, the structuring tool 24 could furthermore, as an alternative or in addition to the energy beam 26, apply a workpiece material locally selectively on the manufacturing platform 12 or the topmost workpiece layer 16, for example in the form of a material powder that is introduced into a melt pool and/or in the form a wire-like material that is placed on the upper workpiece layer 16. In further example embodiments, the apparatus 10 can include more than one structuring tool 24, that is to say it can use two, three or more laser and/or electron beams for producing a workpiece layer.

Structuring tool 24, sometimes simply referred to as a writing laser below, is connected to a controller 30, which controls the movement of laser beam 26 along the first trajectory 28. The controller 30 has an interface 32, via which a data set 34 can be supplied, which data set defines the workpiece to be produced in a plurality of layers arranged one on top of another. In other words, controller 30 controls the movement of the laser beam 26 in dependence on the data set 34, wherein the laser beam 26 describes a respective first trajectory, which results from the data set 34, in each workpiece layer 16 to be produced.

Reference number 36 denotes a measurement arrangement which here includes an exciter 38 and a detector 40. Further details of the measurement arrangement 36 are explained below for various example embodiments with reference to FIGS. 2 to 11.

Exciter 38 generates a second energy beam 42, which in various embodiments is likewise a laser beam. In some example embodiments, laser beam 42 is used to locally selectively heat the upper workpiece layer 16 and preferably also further near-surface workpiece layers below the topmost workpiece layer 16 in order to thermally induce a local deformation of the workpiece layer 16 and further near-surface layers. In other example embodiments, laser beam 42 can be used to induce an ultrasonic wave in near-surface workpiece layer 16, which propagates in workpiece layer 16 and further near-surface workpiece layers of stack 20 and leads to temporary deformations of the stack.

Reference number 44 denotes a detection path via which detector 40 can locally selectively detect the near-surface deformations induced with the aid of the laser beam 42. In some example embodiments, the detector can additionally or alternatively locally selectively measure the temperature of the near-surface workpiece layers.

As explained below with reference to FIGS. 2 to 11 for a plurality of example embodiments, measurement arrangement 36 has a further scanning unit (not shown here), with which laser beam 42 and/or detection path 44 can move along a further trajectory 46. In this example embodiment, measurement arrangement 36 is connected to controller 30, with the result that the controller 30 can control not only the structuring tool 24, but also the movements of the laser beam 42 and/or of the detection path 44.

Some example embodiments of apparatus 10 can include two separate controllers, wherein a first controller controls structuring tool 24, while a separate, second controller controls measurement arrangement 36. In these example embodiments, the two separate controllers are preferably connected via a bidirectional communication interface in order to coordinate the movement of writing beam 26 and the movement of measurement beam 42, 44 with one another in a mutually dependent manner and in particular to avoid a superposition of laser beam 42 used for the measurement with writing beam 26 on the workpiece layer 16. Nevertheless, laser beam 42 and/or detection path 44 can, however, be mechanically decoupled and thus moved on the workpiece layer 16 in a manner detached from writing beam 26.

In the example embodiment shown here, structuring tool 24 and measurement arrangement 36 are controlled with a common controller 30. A first control program for controlling structuring tool 24 and a separate, second control program for controlling measurement arrangement 36 are preferably executed on the controller 30. In various embodiments, the two control programs mentioned exchange control data in a mutually dependent manner via an internal interface of the controller 30. The internal interface can be a pure software interface and/or can be implemented with the aid of a common memory area within the controller 30, to which the two control programs mentioned can each have read and write access. For example, the internal interface can be a dual-ported RAM.

In various embodiments, controller 30 or the respective controllers for structuring tool 24 and measurement arrangement 36 is/are implemented with the aid of commercially available personal computers, on which a commercially available operating system, such as Microsoft Windows, MacOS or Linux, and the control programs mentioned are executed. In some cases, controller 30 can be implemented as a soft PLC on a commercially available PC. As an alternative or in addition, the controllers can be implemented with the aid of dedicated control hardware in the form of one or more ASICs, FPGAs, microcontrollers, microprocessors or other logic circuits.

Figure 2:
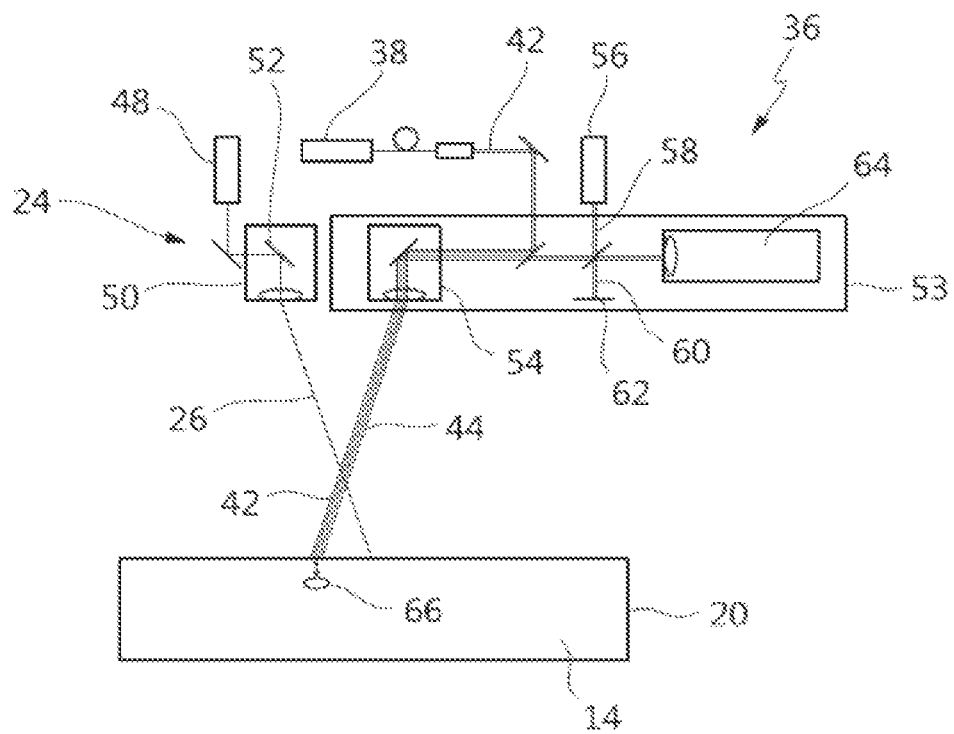
FIG. 2 shows a first variant of the measurement arrangement in the example embodiment according to FIG. 1.

FIG. 2 shows a first example embodiment of a measurement arrangement 36, which can be used in apparatus 10 according to FIG. 1. Same reference numbers denote the same elements as before.

Structuring tool 24 here includes a laser 48 (writing laser) and a first scanning unit 50 with a beam-shaping optical unit, which can include, for example, a movable deflection mirror 52 or another scanning element. With the aid of scanning unit 50, controller 30 can move laser beam 26 along a first trajectory 28 on workpiece 14 in order to produce a new workpiece layer 16. As already indicated further above, an electron beam source could be used instead of a writing laser 48.

The measurement arrangement 36 here consists of a compact, integrated module 53, which includes a further scanning unit 54 with a further beam-shaping optical unit, with which both the laser beam 42 for exciting the workpiece stack 20 and the detection path 44 can be moved on the workpiece surface. The measurement arrangement 36 here includes a further laser as an exciter 38. The further laser (heating laser) can be, for example, a fiber laser with a collimator that generates a collimated laser beam 42. The collimated laser beam 42 is guided to further scanning unit 54 via one or more deflection mirrors in the further beam-shaping optical unit. Accordingly, laser beam 26 and laser beam 42, that is to say generally the first energy beam and the second energy beam, pass through optical beam paths that are completely separate from one another.

Furthermore, measurement arrangement 36 here includes a third laser 56, which is referred to below as a measurement laser. Measurement laser 56 generates a measurement laser beam 58, which is split into two partial beams by a splitter mirror. A first partial beam is guided to second scanning unit 54 and from there, together with laser beam 42, is reflected onto the workpiece surface. A second partial beam 60 is reflected via a mirror 62 in the module 53 and forms a reference measurement beam for an interferometric measurement. A reflection of measurement laser beam 58 at the workpiece surface is captured with further scanning unit 54 along detection path 44 and superimposed with reference measurement beam 60 reflected by mirror 62. An optical sensor 64, which can include a camera with a pixel array, a line-scan camera or an optical point sensor, detects the superposition of the reflected measurement laser beam and the reflected reference measurement beam. As can be seen, measurement laser beam 58 also passes through an optical beam path that is completely separated from the optical beam path of the laser beam 26.

In some example embodiments, measurement arrangement 36 includes a speckle interferometer. Accordingly, measurement arrangement 36 can operate according to the principle of electronic speckle pattern interferometry (ESPI) in order to detect small deformations of workpiece stack 20 resulting from thermal excitation with laser beam 42. In other words, measurement arrangement 36 in this example embodiment includes a speckle interferometer with a measurement laser 56, the beam path 58 of which includes the path to the workpiece surface via the further scanning unit 54. It is characteristic of this example embodiment that the further scanning unit 54 moves laser beam 42 for heating the workpiece surface and measurement laser beam 58 for detecting the thermally induced deformations together along second trajectory 46 (FIG. 1) in order to detect an inhomogeneity/anomaly 66 in an upper workpiece layer. The heating energy of the heating laser spreads from the excitation point on the upper side of the workpiece and the inhomogeneity/anomaly 66 "disturbs" this spreading. With the aid of measurement arrangement 36 it is possible to detect this "disturbance" in the form of a deformation contrast. In particular, it is possible to detect surface deformations perpendicular to the workpiece surface and parallel to the workpiece surface.

Figure 3:
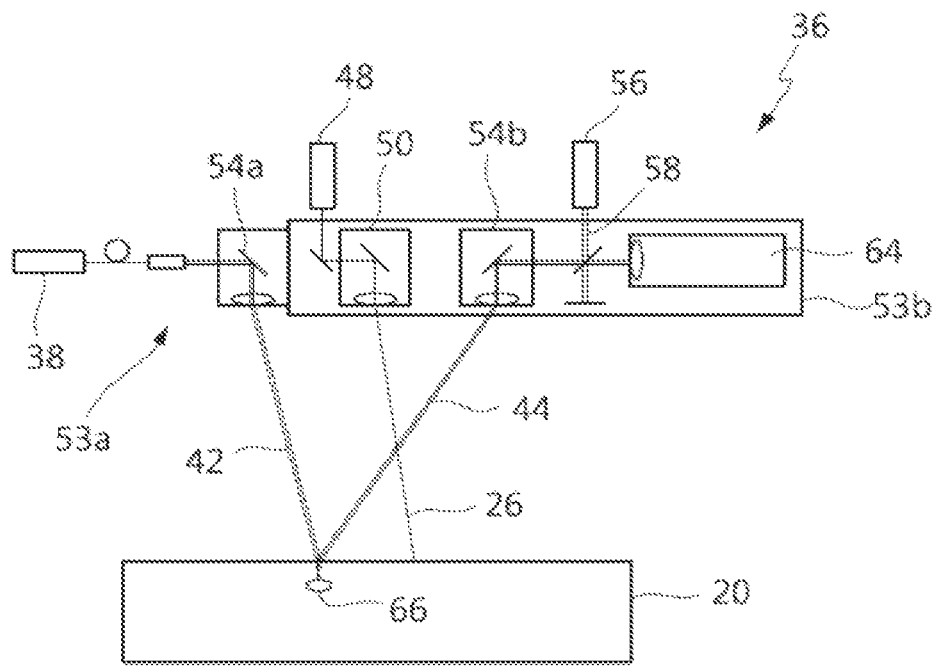
FIG. 3 shows a second variant of the measurement arrangement according to an alternative example embodiment.

FIG. 3 shows a further example embodiment for measurement arrangement 36. In this example embodiment, measurement arrangement 36 includes a first further scanning unit 54*a* and a second further scanning unit 54*b*. Scanning unit 54*a* moves the laser beam 42 of heating laser 38, while scanning unit 54*b* moves the measurement laser beam 58. Scanning units 54*a*, 54*b* are preferably controlled synchronously with respect to one another in order to direct heating laser beam 42 and measurement laser beam 58 or detection path 44 locally selectively onto a common surface point of layer stack 20. In further example embodiments, detection path 44 can follow heating beam 42 at a defined distance (not shown here), wherein this tracking is achieved here solely by suitable control of the deflection units 50, 54*a*, 54*b*. As can be seen in FIG. 3, measurement arrangement 36 in this example embodiment includes two separate housing modules 53*a*, 53*b*, which can be arranged spatially separated from one another and, for example, opposite one another in relation to the manufacturing platform 12. Moreover, this example embodiment of the measurement arrangement 36 can also be based on the principle of speckle interferometry.

Figure 4:
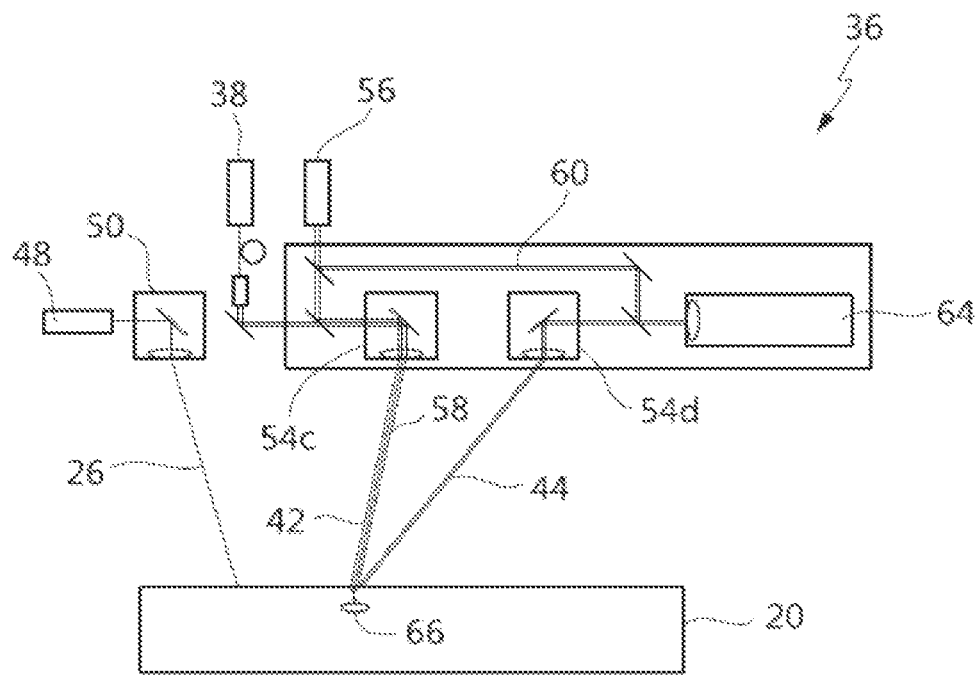
FIG. 4 shows a third variant of the measurement arrangement according to a further example embodiment.

FIG. 4 shows a further example embodiment of measurement arrangement 36. Again, same reference numbers denote the same elements as before. In this example embodiment, measurement arrangement 36 includes a first further scanning unit 54*c*, which moves both heating laser beam 42 and measurement laser beam 58 along a further trajectory 46. A second further scanning unit 54*d* captures a reflection/scattering of measurement laser beam 58 and superimposes the latter with reference measurement beam 60. In this example embodiment, measurement arrangement 36 can also operate according to the principle of speckle interferometry, with a measurement laser whose beam path includes the paths to the measured workpiece surface.

Figure 5:
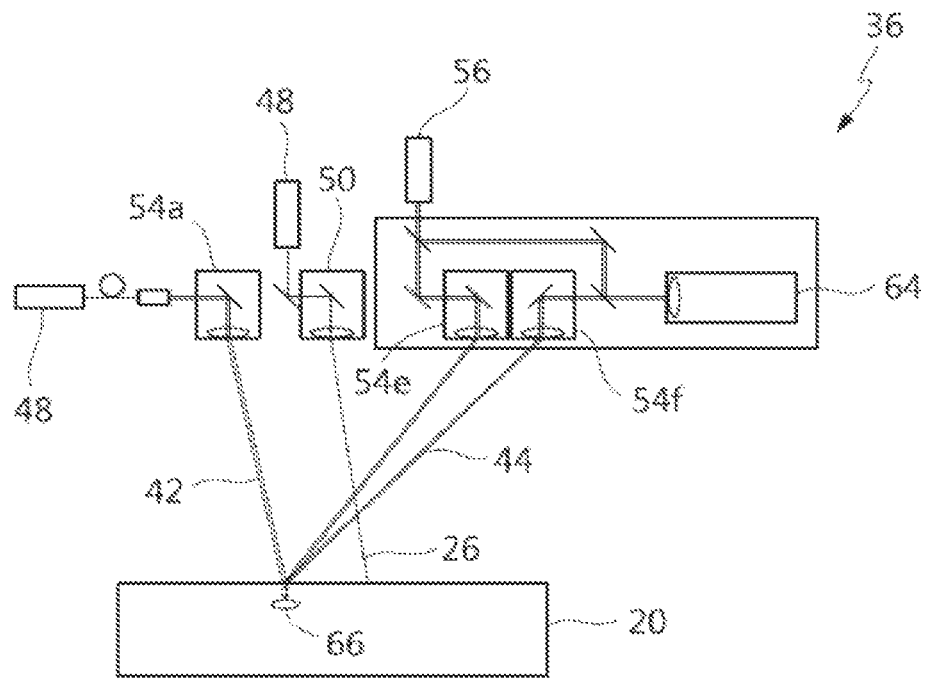
FIG. 5 shows a fourth variant of the measurement arrangement according to a further example embodiment.

FIG. 5 shows a further example embodiment of the measurement arrangement 36. In this example embodiment, a first further scanning unit 54*a* moves heating laser beam 42 along a further trajectory on the surface of layer stack 20. In contrast to the example embodiment according to FIG. 3, measurement arrangement 36 here has a second further scanning unit 54*e*, which moves measurement laser beam 58 on the surface of layer stack 20, and a third further scanning unit 54*f*, which captures a reflection/scattering of measurement laser beam by the surface along detection path 44.

Figure 6:
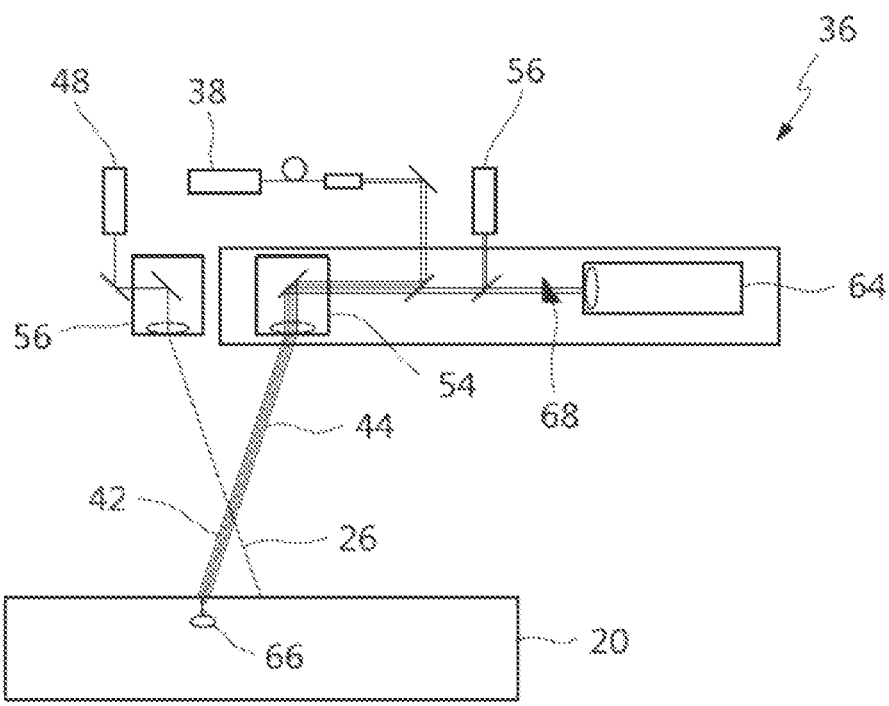
FIG. 6 shows a fifth variant of the measurement arrangement according to a further example embodiment.

FIG. 6 shows a further example embodiment of measurement arrangement 36, which largely corresponds to the example embodiment according to FIG. 2. Same reference numbers designate the same elements as before. In contrast to the example embodiment according to FIG. 2, the example embodiment according to FIG. 6 is based on the principle of shearing interferometry. The measurement arrangement 36 therefore includes a shearing element 68 instead of the beam splitter and the mirror 62 from FIG. 2. The shearing element is typically a prismatic element that generates two slightly shifted images of the surface of layer stack 20 along detection path 44, as a result of which an interferometric measurement becomes possible. Measurement arrangement 36 according to FIG. 6 is quite insensitive to vibrations, since the interfering partial waves for the interferometric measurement are each guided over the surface of layer stack 20. In addition, a shearing interferometer can detect gradients of surface deformations (in contrast to deformations in ESPI). A shearing element and shearing interferometry based thereon can also be used in the other example embodiments.

Figure 7:
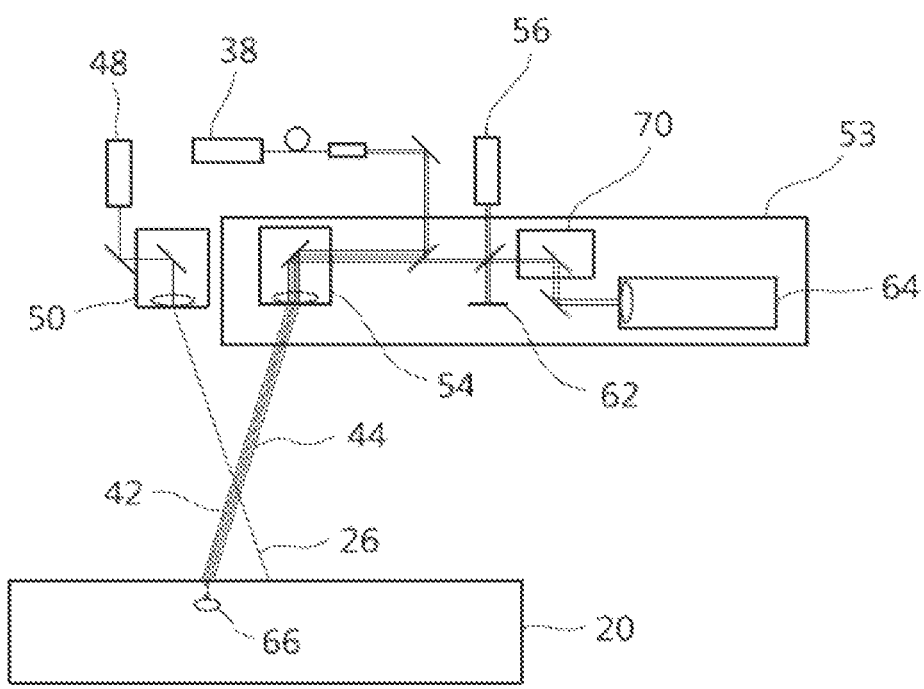
FIG. 7 shows a sixth variant of the measurement arrangement according to a further example embodiment.

FIG. 7 shows a further example embodiment of measurement arrangement 36, which largely corresponds to the example embodiment according to FIG. 2. In contrast to the example embodiment according to FIG. 2, measurement arrangement 36 includes a third scanning unit 70, which is located in the beam path upstream of optical sensor 64. The third scanning unit 70 is here synchronized with the further scanning unit 54 and thus compensates for any motion blur that can occur in particular if the scanning unit 54 is moved continuously while interference images of the surface of workpiece stack 20 are recorded with optical sensor 64. In this example embodiment, the laser spot of writing laser 48 can move within a field of view, while the field of view remains locally selectively stationary for the measurement. Such a use of a third scanning unit is also possible in the other example embodiments.

Figure 8:
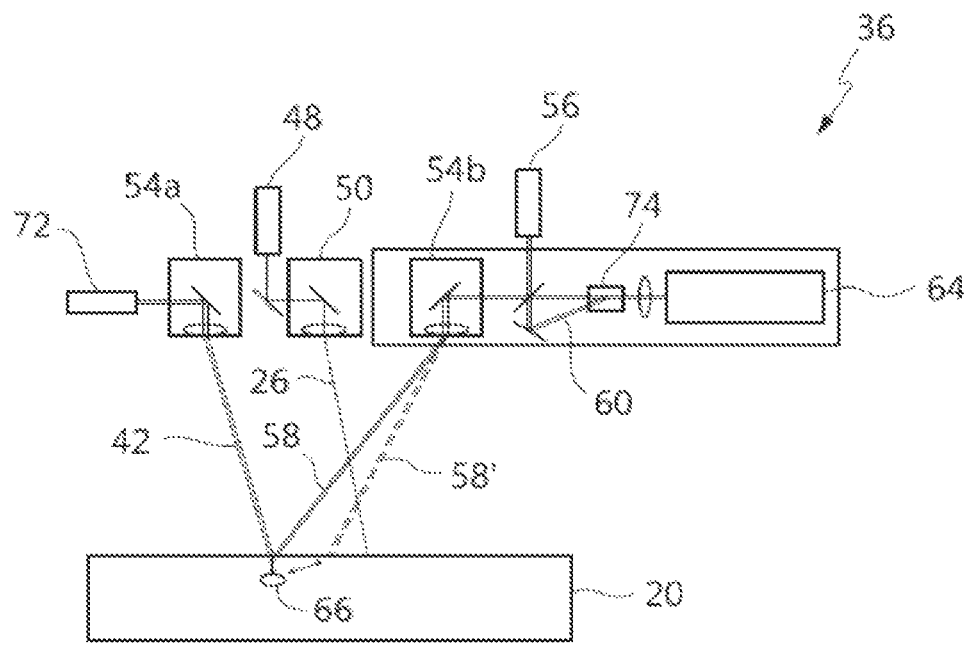
FIG. 8 shows a seventh variant of the measurement arrangement according to a further example embodiment.

FIG. 8 shows a further example embodiment of measurement arrangement 36. Same reference numbers designate the same elements as before. In this example embodiment, measurement arrangement 36 uses a short-pulse laser 72, the laser beam 42 of which excites an ultrasonic wave in workpiece stack 20. The laser beam 42 is focused locally selectively on a position on the surface of workpiece stack 20 with the aid of a first further scanning unit 54a. From there, ultrasonic waves propagate along the surface of the workpiece stack 20 (Rayleigh waves, skimming modes) and into workpiece stack 20 (longitudinal and shear waves). Time-varying local deformations of the stack surface (acoustic near field) occur at the position of the laser spot itself. The measurement laser 56 is used to measure surface deflections and/or changes in speed due to the ultrasonic waves at a fixed or varying distance from the position of the excitation spot. As an alternative or in addition, the time-varying surface deflection can be measured here directly at the position of the excitation spot. The position of measurement laser beam 58 is varied here with the aid of a second further scanning unit 54b. Accordingly, measurement laser beam 58 can be directed here with the aid of further scanning unit 54b optionally to the position of the excitation (shown here at reference number 58) or at a defined distance therefrom (shown here at reference number 58'). In some advantageous variants, controller 30 controls measurement laser beam 58 in the course of a measurement alternately to the position of the excitation and at a defined distance therefrom.

The amplitudes of the deflections typically lie in an order of magnitude of $10^{-10}$ to $10^{-9}$ m, and the speeds in the range from mm/s to cm/s. The measurement can include the deflections of the stack surface in the normal direction ("out-of-plane") or within the surface plane ("in-plane") or both. Here, too, measurement can be carried out interferometrically, as shown, and/or deflectometrically. A deflectometric measurement is based on the deflection of measurement laser beam 58 as a result of the induced deformation of the stack surface and a spatially resolved detection of the deflected measurement laser beam.

The measurement arrangement 36 according to FIG. 8 is based on interferometric measurement, wherein the illumination of the stack surface with the measurement laser beam 58 and the measurement of the reflection and/or scattering take place here together via the second further scanning unit 54b. On account of their high detectivity/sensitivity, interferometers based on a photorefractive crystal 74, such as two-wave mixing interferometers or a photo-induced EMF detector, with the aid of which the reflected measurement laser beam and the partial beam 60 (reference beam) are superposed and also Fabry-Perot interferometers or fiber-based Sagnac interferometers are suitable for measuring the deformations on the surface that are excited by ultrasound propagation in the workpiece stack. The measurement determines-depending on the design of the interferometer-deformations (in-plane, out-of-plane) or speeds (time-dependent deformations).

In various embodiments, first further scanning unit 54a and second further scanning unit 54b are controlled synchronously with respect to each other in order to optionally keep the distance between the positions of the laser spots for the excitation of the ultrasonic wave and for the measurement during the movement over workpiece stack 20 constant at 0, constant at a fixed value, and/or to vary it depending on the properties of workpiece stack 20 in the course of a measurement. At each measurement position, the measurement data are recorded over a period of several nanoseconds up to milliseconds with a time resolution in the nanosecond range. This forms what is known as the A-scan. In some example embodiments, the measurement data of an A-scan along a trajectory 46 can be combined to form a B-scan. The entirety of all A-scans, i.e. the measurement data for all measurement positions at workpiece stack 20, is typically referred to as a C-scan, as is known per se to a person skilled in the field of ultrasonic measurement.

In the case of identical or overlapping excitation and measurement positions, the region located immediately below the surface of the workpiece stack 20 is inspected for inhomogeneities/anomalies 66. In some advantageous example embodiments, a comparison of data from an A-scan with the simulation of the laser excitation of the surface and its interaction with the near-surface inhomogeneities provides information relating to inhomogeneities/anomalies 66 directly below the respective measurement position. B-scans and the C-scan use image processing methods to provide further information relating to inhomogeneities/anomalies, in particular relating to laterally extended defects, such as cracks.

In the event of a fixed or varying distance between the excitation position and the measurement position, models of the propagation of ultrasonic modes and their interaction with inhomogeneities/anomalies, such as reflection, scattering, Lamb modes, are used and advantageously utilized to evaluate the measurement data. Accordingly, in some advantageous example embodiments, measurement arrangement 36 is configured to localize and/or quantify inhomogeneities/anomalies 66 using B-scans and/or the C-scan. In some example embodiments, measurement arrangement 36 is advantageously configured to use machine learning methods in order to detect inhomogeneities/anomalies 66 and to classify them with regard to size, depth, and/or type. An analysis of the measurement data can include an evaluation both in the time domain and in the frequency domain using Fourier methods.

Figure 9:
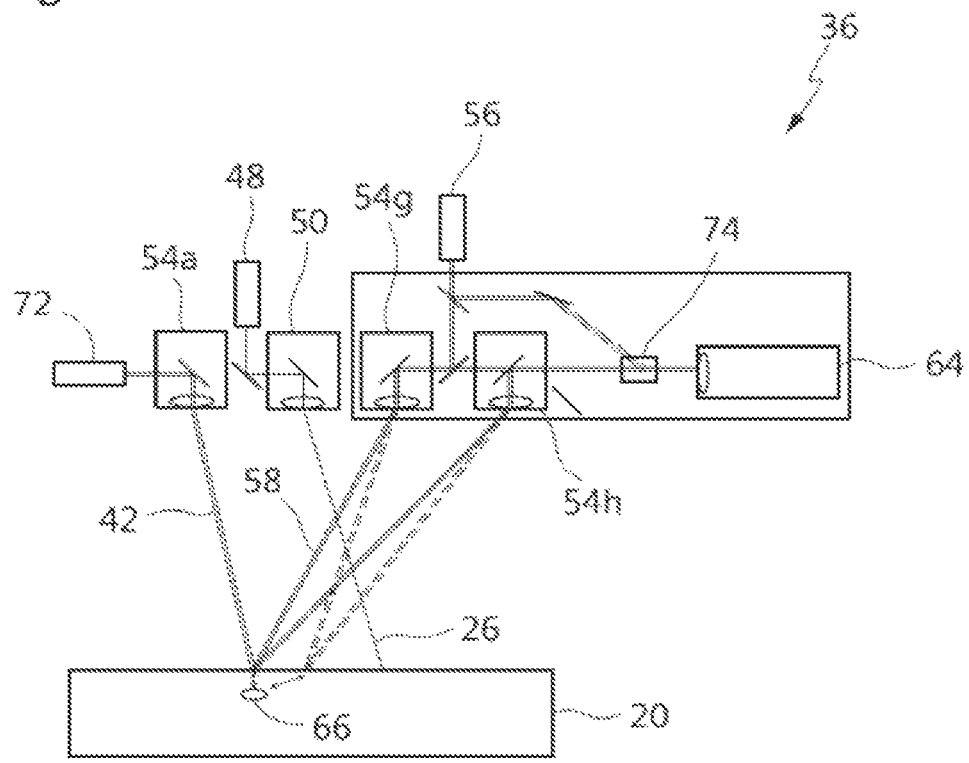
FIG. 9 shows an eighth variant of the measurement arrangement according to a further example embodiment.

FIG. 9 shows a further example embodiment of a measurement arrangement 36, which is based on the excitation of ultrasonic waves in workpiece stack 20. The measurement arrangement 36 according to FIG. 9 here includes three further scanning units 54a, 54g and 54h. The further scanning unit 54a moves the laser beam 42 to excite the ultrasonic wave along a further trajectory. The further scanning unit 54g here moves a measurement laser beam synchronously with respect to the scanning unit 54a, the reflection of which at the surface of the workpiece stack 20 is detected locally selectively with the aid of the further scanning unit 54h.

Also in the example embodiments that are based on excitation of an ultrasonic wave, a third scanning unit 70 (not shown here) corresponding to the example embodiment according to FIG. 7 can be used in order to reduce motion blur during a continuous movement of the further scanning units. The laser beams used for the inspection can be moved, in a manner detached from the writing beam 26, along a trajectory 46 optimized for the inspection of workpiece stack 20 (see FIG. 1), wherein the movement can optionally include jumps from a measuring position to a spatially distant measurement position. The heating laser 38 in the example embodiments according to FIGS. 2 to 7 can be operated continuously (continuous wave) or pulsed. In further example embodiments, which are not shown separately here, the excitation of the workpiece stack 20 can take place globally, and only the detection of the temperature contrasts, deformation contrasts or deformations of the stack 20 is detected in a spatially resolved manner.

Figure 10:
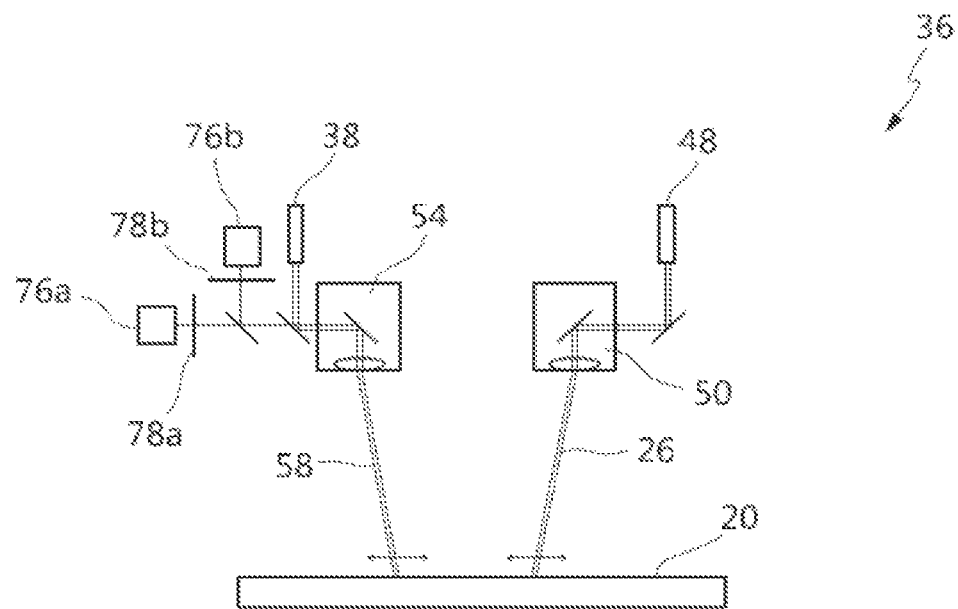
FIG. 10 shows a ninth variant of the measurement arrangement according to a further example embodiment.

FIG. 10 shows a further example embodiment of a measurement arrangement 36. Same reference numbers continue to denote the same elements as before.

In this example embodiment, measurement arrangement 36 includes a first camera 76a and a second camera 76b and also a first bandpass filter 78a and a second bandpass filter 78b. The bandpass filters 78a, 78b have mutually different pass ranges, with the result that cameras 76a, 76b capture different spectral bands. In some example embodiments, cameras 76a, 76b have a sensitivity in the near infrared range (NIR, $\lambda < 1.1$ μm) or in the short-wave infrared range (SWIR). The temperature at the surface of workpiece stack 20 can be determined in each pixel of the cameras from the ratio of the intensities of the radiation that is reflected by the surface of workpiece stack 20 and measured in each case. Accordingly, measurement arrangement 36 in this example embodiment is configured to make a direct, spatially resolved temperature measurement of workpiece stack 20 possible. In this example embodiment, heating laser 38 is used to induce a temperature contrast between an inhomogeneity/anomaly in workpiece stack 20 and the surrounding surface of workpiece stack 20.

Figure 11:
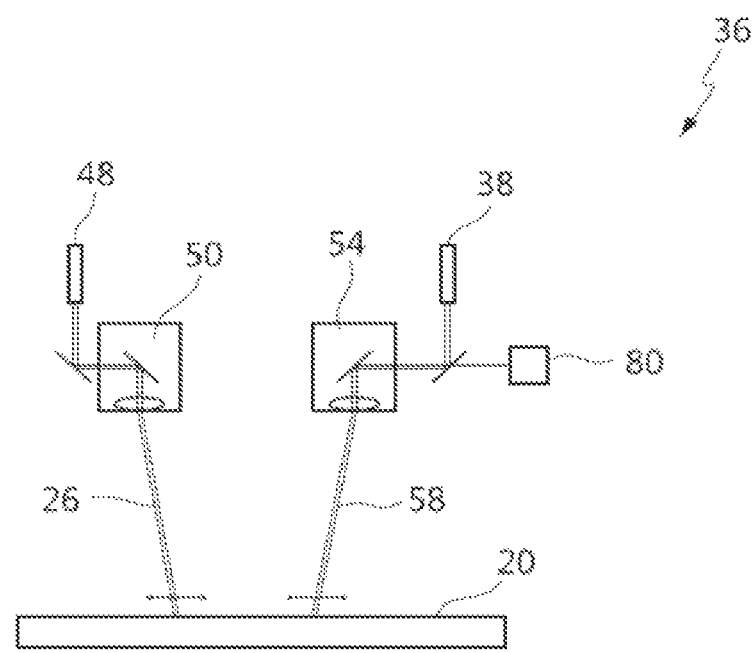
FIG. 11 shows a tenth variant of the measurement arrangement according to a further example embodiment.

FIG. 11 shows a further example embodiment of the measurement arrangement 36, wherein an infrared camera 80 is used here instead of the two cameras 76a, 76b and the respectively assigned bandpass filters 78a, 78b.

It should be noted that the described example embodiments of the measurement arrangement 36 can also be combined with one another in that a measurement arrangement 36 can include, for example, both a temperature measurement according to FIGS. 10 and/or 11 and also an ultrasonic measurement according to FIG. 8 or 9 and/or an interferometric and/or deflectometric measurement of thermally induced deformations.

Figure 12:
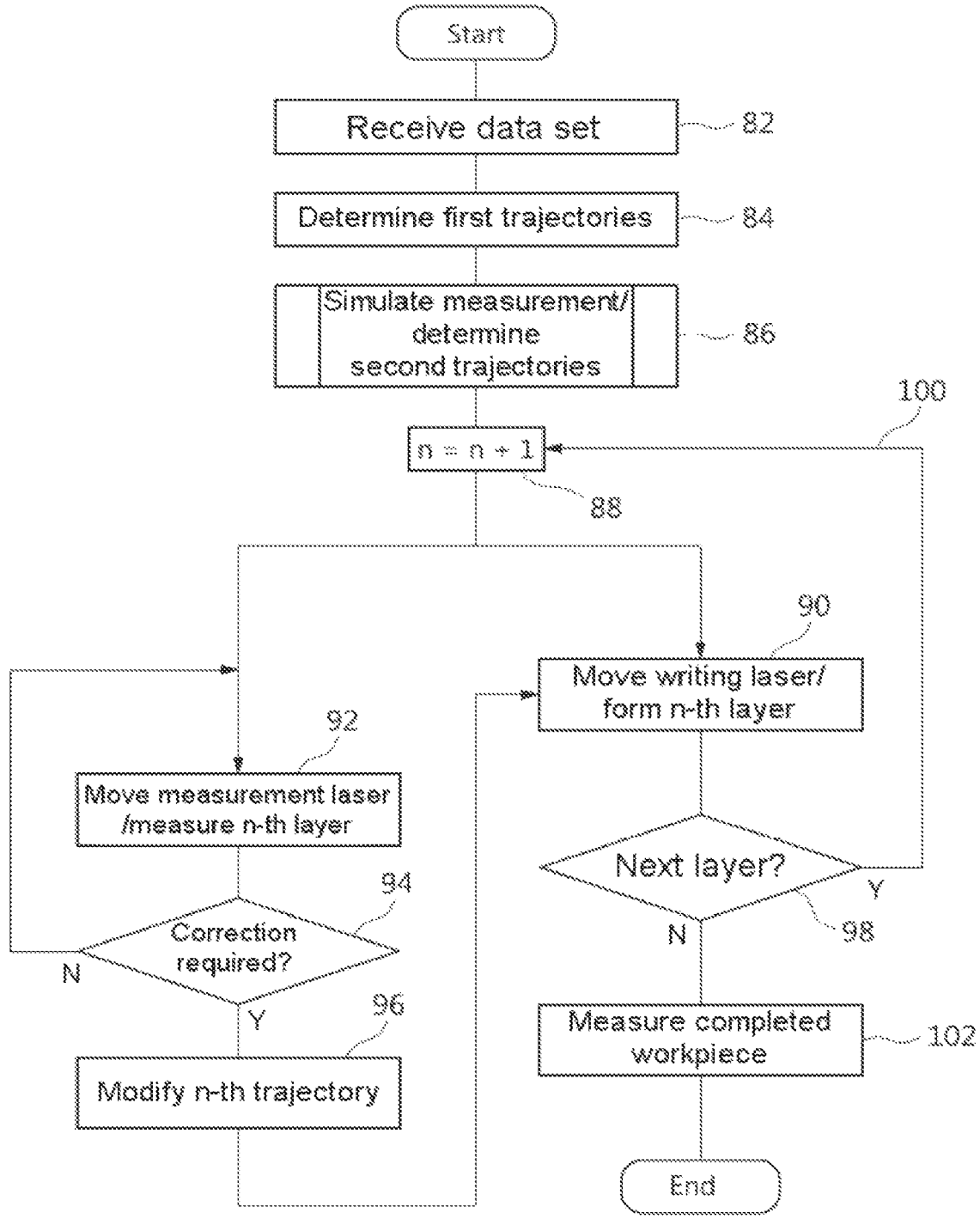
FIG. 12 shows a flowchart for explaining an example embodiment of the novel method.

FIG. 12 shows a flow chart for explaining an example embodiment of the novel method. In step 82, a data set that defines a workpiece to be produced in a plurality of layers arranged one on top of another is obtained. According to step 84, based on the data set from step 82, first trajectories along which a laser or electron beam is to be moved in each case in order to structure a workpiece layer are determined. According to step 86, depending on the data set from step 82 and the first trajectories from step 84, second trajectories along which a spatially resolved measurement of the workpiece layers is to take place are determined. In various embodiments, the measurement for each workpiece layer is simulated with the aid of a computer, in particular in order to avoid superposition of the writing beam and a measurement beam/detection path.

A counting variable is set here in step 88 and is incremented in each of the following manufacturing steps. According to step 90, an n-th workpiece layer is then produced with the aid of the structuring tool. According to step 92, the n-th layer is measured in parallel with the aid of measurement arrangement 36. In various embodiments, the measurement of the n-th layer begins with a time delay with respect to the production of the n-th layer in accordance with step 90, wherein regions of the n-th workpiece layer 90 that have already been produced are measured while other regions of the n-th workpiece layer are still being produced. As explained above, the measurement arrangement in this case uses a scanning unit 54 or scanning units 54a, 54b, 54c, 54d, 54e, 54f, 54g, 54h, which are structurally separate from the scanning unit 50 and each establish beam paths through which the writing beam 26 of the structuring tool 24 does not travel.

According to step 94, the measurement data are evaluated and a decision is made as to whether a correction of the n-th workpiece layer is necessary. This can be the case in particular when the measurement data represent inhomogeneities/anomalies in the n-th workpiece layer and/or in the workpiece layers below. If a correction appears to be necessary, the first trajectory for the n-th workpiece layer is modified here in accordance with step 96, with the result that the inhomogeneity/anomaly can already be corrected in the course of the production of the n-th workpiece layer. In other words, the trajectory determined in step 84 for the n-th workpiece layer is supplemented by further movements and/or specific movements are modified in step 84 such that a correction of detected inhomogeneities/anomalies becomes possible. If no correction appears to be necessary, step 96 can be omitted for the corresponding workpiece layer and the "measurement path" of the method begins again in step 92.

When the production of the n-th layer, including any corrections, has been completed, a check is performed according to step 98 as to whether a further workpiece layer is to be produced. If so, the method returns to step 88 in accordance with the loop 100. When the production of all workpiece layers has been completed, the workpiece produced can in some preferred variants of the method be measured again as a whole in accordance with step 102. For example, the workpiece can be measured in step 102 with the aid of x-rays and/or with the aid of coordinate measuring methods that are conventional in the art in order to check compliance with predetermined specifications. The phrase "at least one of A, B, and C" should be construed to mean a logical (A OR B OR C), using a non-exclusive logical OR, and should not be construed to mean "at least one of A, at least one of B, and at least one of C."

The invention claimed is:

1. A method for additive manufacturing of a workpiece using a structuring tool having a first scanning unit, the method comprising:
   obtaining a data set that defines the workpiece in a plurality of layers arranged one on top of another;
   determining a plurality of first trajectories using the data set;
   moving a first energy beam of the first scanning unit in a spatially resolved manner relative to a manufacturing platform in temporally successive steps along a respective first trajectory from the plurality of first trajectories to produce, in the temporally successive steps, a stack of workpiece layers arranged one on top of another, wherein the workpiece layers correspond to the plurality of first trajectories;
   determining individual properties of the stack using a measurement arrangement including (i) an exciter that excites the stack with a second energy beam and (ii) a detector that detects properties of the stack resulting from an excitation along a defined detection path in a spatially resolved manner; and
   moving at least one of the second energy beam and the detection path relative to the manufacturing platform along a plurality of further trajectories using a further scanning unit,
   wherein the first scanning unit and the further scanning unit establish completely separate beam paths for the first energy beam and the at least one of the second energy beam and the detection path, and
   wherein the plurality of further trajectories differ at least partially from the plurality of first trajectories.

2. The method of claim 1, wherein the at least one of the second energy beam and the detection path is moved in one of the temporally successive steps along a further trajectory from the plurality of further trajectories, while the first energy beam is moved along a first trajectory.

3. The method of claim 1, further comprising determining the plurality of further trajectories based on the plurality of first trajectories.

4. The method of claim 1, wherein the first energy beam and the second energy beam are moved in a coordinated manner such that a superposition of the first energy beam and the second energy beam on the stack is avoided.

5. The method of claim 1, wherein:
the manufacturing platform has a platform diameter, and
the method includes positioning, during the additive manufacturing of the workpiece, the at least one of the second energy beam and the detection path at a lateral distance from the first energy beam that is greater than half the platform diameter.

6. The method of claim 1, wherein:
the manufacturing platform has a platform diameter, and
the method includes, during an entirety of the additive manufacturing of the workpiece, positioning at least one of the second energy beam and the detection path at a lateral distance from the first energy beam that is greater than half the platform diameter.

7. The method of claim 1, wherein the exciter and the detector are arranged in separate housing modules that are spatially distant from one another.

8. The method of claim 7, wherein the separate housing modules are arranged on different sides of the manufacturing platform.

9. The method of claim 1, wherein selected first trajectories from the plurality of first trajectories are modified based on the individual properties of the stack.

10. The method of claim 9, wherein the plurality of further trajectories are determined iteratively based on the selected first trajectories from the plurality of first trajectories.

11. The method of claim 1, wherein the further scanning unit moves the second energy beam and the detection path together along the plurality of further trajectories.

12. The method of claim 1, wherein:
the further scanning unit has a first further scanning unit and a structurally separate second further scanning unit,
the second energy beam is moved using the first further scanning unit, and
the detection path is moved using the second further scanning unit.

13. The method of claim 1, wherein:
the at least one of the second energy beam and the detection path is continuously moved using the further scanning unit, and
the measurement arrangement includes a third scanning unit that follows the further scanning unit.

14. The method of claim 1, further comprising:
selectively heating the stack using the exciter; and
detecting, using the measurement arrangement, deformation contrasts in the stack resulting from selective heating.

15. The method of claim 1, further comprising generating an ultrasonic wave in the stack using the exciter.

16. The method of claim 1, wherein the measurement arrangement detects temperature contrasts in the stack.

17. An apparatus for additive manufacturing of a workpiece, the apparatus comprising:
an interface for obtaining a data set that defines the workpiece in a plurality of layers arranged one on top of another;
a manufacturing platform;
a structuring tool including a first scanning unit configured to move a first energy beam in a spatially resolved manner relative to the manufacturing platform;
a controller configured to control the first scanning unit using the data set to move the first energy beam relative to the manufacturing platform in temporally successive steps along a plurality of first trajectories, wherein the structuring tool produces, in the temporally successive steps, a stack of workpiece layers arranged one on top of another, and wherein the workpiece layers correspond to the plurality of first trajectories; and
a measurement arrangement configured to determine individual properties of the stack,
wherein the measurement arrangement includes an exciter configured to excite the stack with a second energy beam,
wherein the measurement arrangement includes a detector configured to detect properties of the stack resulting from an excitation along a detection path in a spatially resolved manner,
wherein the measurement arrangement includes a further scanning unit,
wherein the controller is configured to control the further scanning unit separately from the first scanning unit in such a manner that at least one of the second energy beam and the detection path moves relative to the manufacturing platform along a plurality of further trajectories,
wherein the plurality of further trajectories can differ from the plurality of first trajectories, and
wherein the first scanning unit and the further scanning unit establish completely separate beam paths for the first energy beam and the at least one of the second energy beam and the detection path.

* * * * *